L. BRUGER.
OPEN MESH JOINT IN TEXTILE AND OTHER FABRIC AND METHOD OF MAKING THE SAME.
APPLICATION FILED JULY 28, 1919.

1,340,117. Patented May 11, 1920.

Witness

Inventor
Louise Bruger
E. S. Clark
Attorney

UNITED STATES PATENT OFFICE.

LOUISE BRUGER, OF JERSEY CITY, NEW JERSEY.

OPEN-MESH JOINT IN TEXTILE AND OTHER FABRIC AND METHOD OF MAKING THE SAME.

1,340,117.   Specification of Letters Patent.   Patented May 11, 1920.

Application filed July 28, 1919. Serial No. 313,725.

*To all whom it may concern:*

Be it known that I, LOUISE BRUGER, a citizen of the United States, residing at Jersey City, in the county of Hudson and State of New Jersey, have invented certain new and useful Improvements in Open-Mesh Joints in Textile and other Fabric and Methods of Making the Same, of which the following is a specification.

This invention relates to a method of joining two pieces of textile fabric one or both of which may be embroidered, or a piece of woven fabric with a piece of crochet fabric, by means of open mesh crochet stitching in connection with uniformly spaced or gaged eyelets placed within parallel guide lines or tape strips at the edges of the pieces of fabric to be joined; also to the resulting article of manufacture having the above indicated features of construction.

The object of my invention is to provide articles of manufacture, such as apparel, covers, scarfs, etc., made of different parts, with neat, artistic and effective joining devices, consisting of guide lines, uniformly spaced eyelets and crochet stitching arranged in open mesh effect, for joining any two parts or pieces of the finished article.

The matter constituting my invention will be defined in the claims.

I will now describe the details of construction and arrangement of my joining devices by reference to the accompanying drawings, in which.

Figure 1:
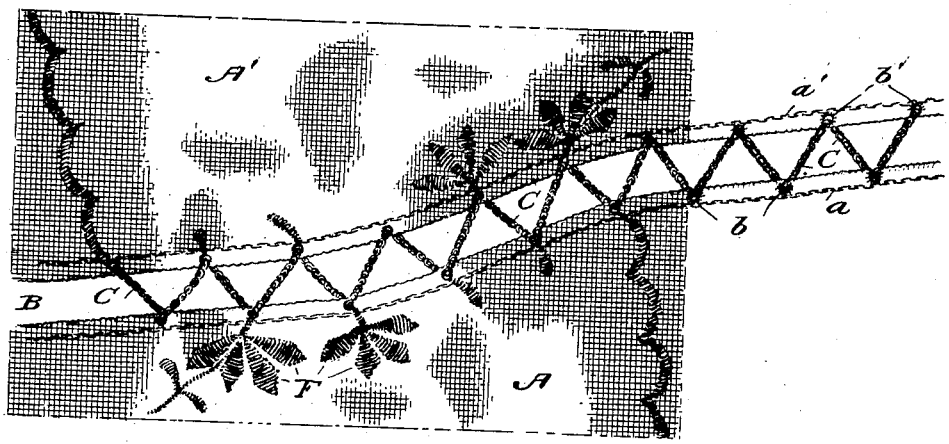
Figure 1 represents a plan view of pieces of woven and embroidered fabric and my open mesh joining devices.

Two pieces of woven fabric A, A', which are to be joined as in Fig. 1, are each provided at, or near, their edges with parallel guide lines $a$, $a'$, which may be produced by stitching on an embroidery machine or a sewing machine. Within each pair of guide lines $a$, $a'$ is made a series of uniformly spaced or gaged eyelets $b$, $b'$, which are preferably embroidered as indicated. In different pieces and kinds of fabric these eyelets may be spaced at different distances apart, but will be uniformly spaced in any one piece of fabric, and they may be made of different sizes in different pieces of fabric. The pieces of fabric A, A' are spaced the desired distance apart, as a half inch, more or less, and then the joint B is made by the diagonal crochet stitching C connecting in diagonal manner with the eyelets $b$, $b'$ in the opposite pieces of fabric. The spaced eyelets enable the worker to produce smooth, even work and a pleasing artistic effect. The result of assembling the above features is an open mesh joint B, which is more artistic and pleasing than the usual close, hard seam which has been heretofore used. My open mesh crochet joint B imparts to pieces of machine embroidery the appearance of handwork. Any form of embroidered figures F may be worked on the pieces of fabric A, A' and such figures may connect by stems with some of the eyelets $b$, $b'$, as shown.

Figure 2:
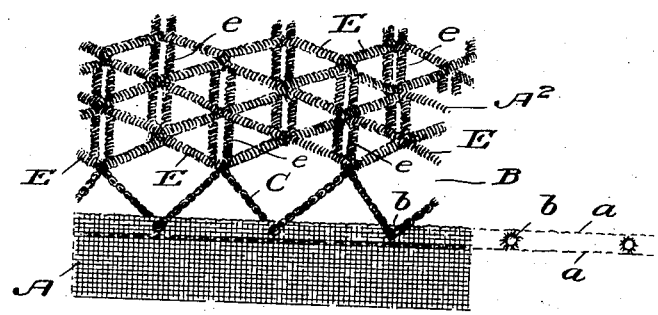
Fig. 2 represents a plan view, showing a woven fabric joined to a piece of crochet fabric by open mesh crochet stitches and the other devices used in the joint.
Figure 3:
Fig. 3 represents a perspective detail view of crochet stitching, on enlarged scale.

In Fig. 2 I have shown a piece of woven fabric A united to a piece of crochet fabric $A^2$ by an open mesh composed of diagonal crochet stitching C. The crochet fabric is composed of series of diamond-shaped elements or figures E, each having a central transverse web or bar $e$. The webs in the figures will be spaced a uniform distance apart, and each web will serve as the attaching point for the diagonal crochet connecting stitching C. These stitchings will connect with the spaced eyelets $b$ in the woven fabric A to form an open mesh joint B. The crochet fabric $A^2$ may be of any desired design, but will preferably have at its edge uniformly spaced identical elements to serve as attaching points for the connecting crochet stitching.

Instead of guide lines formed by parallel lines of stitches $a$, narrow tape may be applied to a piece of fabric at its edge and serve as guide lines. The spaced eyelets $b$ would be made in the tape.

Heretofore, in the construction of an article of apparel, such a corset cover, a sewed seam has been covered with embroidery stitches and the embroidery extended on either side upon the fabric for the purpose of concealing the seam and giving a more artistic finish to the article. It has also been proposed to unite two pieces of fabric by placing their selvage edges together in the same plane and then connecting them by flat seam stitching and covering the same and extending upon the fabric at each side of the seam.

An edging or border composed of crochet stitching connecting to a base in the form of loops has been proposed, but a crochet chain is only one of the elements in my open mesh joint combination and is not separately claimed, but is a part or element of my combination to form a joint with an open mesh effect. In such combination it is useful and artistic and coöperates with other parts to produce a new article of manufacture, and contributes to a mechanical method of joining different pieces of fabric.

A lacing thread in figure 8 form (a single thread) has been proposed for joining the whipped edges of two pieces of cloth, but in such joint no crocheted chain was used, nor any guide lines or spaced eyelets, and my article of manufacture was not produced.

I am also aware that it has been proposed to produce compound fabrics suitable for curtains, tablecloths, etc., composed of ribbons or strips of contrasting colors and various kinds of woven goods, joined by open work stitching, which, as shown, was simply straight transverse parallel threads.

This construction did not embrace my open mesh joint composed of crochet stitches, guide lines and spaced eyelets. My particular construction is to enable amateur and unskilled workers to accurately make the open mesh joints by transverse or zigzag lines of crochet stitchings or chains.

My joint is distinguished from the above by the provision of series of eyelets along the edges of pieces of fabric, which latter are spaced apart and connected by a series of diagonal crochet stitches to form an open mesh. This open mesh joint is applicable to various articles of apparel and can be effectively used for uniting a crochet yoke or an embroidered yoke to a body of woven fabric; also for uniting parts of a scarf or table cover, or other article of manufacture.

Having described my invention, what I claim and desire to secure by Letters Patent is:

1. The method of uniting pieces of fabric, which consists in providing one or more edges with parallel guide lines, forming uniformly spaced eyelets between said lines, then spacing the two pieces of fabric a short distance apart and uniting them by crochet stitches connecting at the eyelets and forming an open mesh joint.

2. An article of manufacture comprising two pieces of fabric spaced apart and united by an open mesh joint composed of parallel guide lines at or near the edges of the fabric, a series of uniformly spaced eyelets between said lines, and crochet stitches connecting at the opposite eyelets and forming an open mesh joint.

3. An open mesh joint for adjacent pieces of fabric consisting of parallel guide lines at or near the edges of the pieces of fabric, a series of uniformly spaced eyelets between the guide lines and inclined lines of crochet stitches connecting the opposite series of eyelets, the pieces of fabric being spaced apart, thereby providing an open mesh and a neat, smooth finish in the article.

4. An article of manufacture composed of a piece of woven fabric having at its edge parallel guide lines, a series of uniformly spaced eyelets between said lines, a piece of crochet fabric having at its edge a series of spaced identical elements, a series of diagonal crochet stitchings connecting with said eyelets and said crochet elements, the two pieces of fabrics being spaced apart and an open mesh joint formed.

In testimony whereof I affix my signature in presence of two witnesses.

LOUISE BRUGER.

Witnesses:
 CORA SHELTON,
 DOROTHY YUNGHAHN.